US010450958B2

(12) United States Patent
Tashima et al.

(10) Patent No.: US 10,450,958 B2
(45) Date of Patent: Oct. 22, 2019

(54) TURBINE AND POWER GENERATION SYSTEM

(71) Applicant: TOSHIBA ENERGY SYSTEMS & SOLUTIONS CORPORATION, Kawasaki-shi, Kanagawa (JP)

(72) Inventors: Tsuguhisa Tashima, Yokohama (JP); Shogo Iwai, Yokohama (JP); Masao Ito, Yokohama (JP); Shunsuke Takae, Yokohama (JP)

(73) Assignee: TOSHIBA ENERGY SYSTEMS & SOLUTIONS CORPORATION, Kawasaki-Shi (JP)

( * ) Notice: Subject to any disclaimer, the term of this patent is extended or adjusted under 35 U.S.C. 154(b) by 663 days.

(21) Appl. No.: 14/595,986

(22) Filed: Jan. 13, 2015

(65) Prior Publication Data

US 2015/0121898 A1    May 7, 2015

Related U.S. Application Data

(63) Continuation of application No. PCT/JP2013/004416, filed on Jul. 19, 2013.

(30) Foreign Application Priority Data

Jul. 20, 2012 (JP) ................................. 2012-161309
Jul. 18, 2013 (JP) ................................. 2013-149069

(51) Int. Cl.
*F02C 7/16* (2006.01)
*F01D 9/06* (2006.01)
(Continued)

(52) U.S. Cl.
CPC ................ *F02C 7/16* (2013.01); *F01D 9/023* (2013.01); *F01D 9/06* (2013.01); *F01D 25/12* (2013.01);
(Continued)

(58) Field of Classification Search
CPC . F01D 9/023; F01D 9/06; F01D 9/065; F01D 25/08; F01D 25/12; F01D 25/266;
(Continued)

(56) References Cited

U.S. PATENT DOCUMENTS 2,815,645 A * 12/1957 Downs ...................... F01D 9/06
                                                        165/134.1
4,498,289 A *  2/1985 Osgerby ............... F01K 25/103
                                                          60/39.17
(Continued)

FOREIGN PATENT DOCUMENTS

EP    1 079 067 A2    2/2001
EP    1 801 356 A2    6/2007
(Continued)

OTHER PUBLICATIONS

International Search Report issued in International Patent Application No. PCT/JP2013/004416 dated Aug. 13, 2013.

*Primary Examiner* — Craig Kim
*Assistant Examiner* — Katheryn A Malatek
(74) *Attorney, Agent, or Firm* — Foley & Lardner LLP (57) ABSTRACT

A turbine and so on capable of enabling high reliability are provided. In the turbine of an embodiment, a turbine rotor is accommodated in a turbine casing, and is rotated by a working medium which is introduced after flowing in an inlet pipe of a combustor. A sleeve is provided at the turbine casing, and accommodates the inlet pipe therein. Here, the sleeve is thicker than the inlet pipe, and a cooling fluid whose temperature is lower than the working fluid flows between the inlet pipe and the sleeve.

9 Claims, 6 Drawing Sheets

(51) Int. Cl.
   *F01D 25/12*   (2006.01)
   *F01D 25/26*   (2006.01)
   *F02C 7/24*    (2006.01)
   *F01D 9/02*    (2006.01)
   *F02C 3/34*    (2006.01)
   *F02C 7/18*    (2006.01)

(52) U.S. Cl.
   CPC ............... *F01D 25/26* (2013.01); *F02C 3/34* (2013.01); *F02C 7/24* (2013.01); *F01D 9/065* (2013.01); *F02C 7/18* (2013.01); *F05B 2260/205* (2013.01); *F05D 2210/12* (2013.01); *F05D 2260/20* (2013.01)

(58) Field of Classification Search
   CPC .... F05D 2250/51; F05D 2260/20; F02C 7/16; F02C 7/18; F05B 2260/205
   See application file for complete search history.

(56) References Cited

U.S. PATENT DOCUMENTS

| | | | |
|---|---|---|---|
| 4,550,569 A * | 11/1985 | Isa | ............................ F01D 9/06 415/176 |
| 5,644,911 A | 7/1997 | Huber | |
| 6,379,117 B1 | 4/2002 | Ichiryu | |
| 7,490,472 B2 * | 2/2009 | Lynghjem | .............. B01D 53/62 60/39.52 |
| 8,142,146 B2 | 3/2012 | Kawakami | |
| 2007/0144177 A1 | 6/2007 | Burd | |
| 2011/0016884 A1 | 1/2011 | Hashimoto et al. | |

FOREIGN PATENT DOCUMENTS

| | | |
|---|---|---|
| EP | 2 028 345 A2 | 2/2009 |
| EP | 2 196 650 A1 | 6/2010 |
| JP | S55-081233 A | 6/1980 |
| JP | 58-126404 A | 7/1983 |
| JP | 59-229003 A | 12/1984 |
| JP | 08-277703 A | 10/1996 |
| JP | H10-266806 A | 10/1998 |
| JP | H11-141879 A | 5/1999 |
| JP | 11-510581 A | 9/1999 |
| JP | 2001-059401 A | 3/2001 |
| JP | 2007-064588 A | 3/2007 |
| JP | 2007-170810 A | 7/2007 |
| JP | 2009-047123 A | 3/2009 |
| JP | 2010-255542 A | 11/2010 |
| KR | 10-2010-0116226 A | 10/2010 |
| WO | WO-01/31244 A2 | 5/2001 |

* cited by examiner

TURBINE AND POWER GENERATION SYSTEM

CROSS-REFERENCE TO RELATED APPLICATIONS

This application is a continuation of prior International Application No. PCT/JP2013/004416 filed on Jul. 19, 2013, which is based upon and claims the benefit of priority from Japanese Patent Applications No. 2012-161309 filed on Jul. 20, 2012, and No. 2013-149069 filed on Jul. 18, 2013; the entire contents of all of which are incorporated herein by reference.

FIELD

Embodiments described herein relate generally to a turbine, and a power generation system.

BACKGROUND

In a power generation system, a combustor is provided at an upstream side of a turbine, and a high-temperature working fluid flows from the combustor to the turbine. In the turbine, a turbine rotor is accommodated in a turbine casing, and the turbine rotor rotates by the supplied working fluid. At the power generation system, power generation is performed by a power generator driven by the rotation of the turbine rotor.

In the power generation system, an operation of the turbine is performed by using a high-temperature and high-pressure working fluid so as to improve a power generation efficiency. For example, when a gas turbine is used in the power generation system, there is a case when combustion gas at 1700° C. is used as the working fluid. Besides, it is proposed that carbon dioxide ($CO_2$) whose temperature at an entrance of the turbine is 800° C. or more and pressure is 20 MPa or more is used as the working fluid.

When the high-temperature and high-pressure working fluid as stated above is used, there is a case when a mechanical strength of the turbine casing is lowered resulting from the operation over a long term. Accordingly, it is proposed to cool a part and so on where the working fluid is introduced in the turbine casing by using a cooling fluid so as to improve reliability of the turbine casing.

However, there is a case when it is not easy to enable high reliability because the turbine casing is not able to be enough cooled.

Besides, it is conceivable to form the turbine casing with a material such as an Ni-based alloy to increase safety of the turbine operated by the high-temperature and high-pressure working fluid. However, the material such as the Ni-based alloy is expensive, and a manufacturing cost increases. Besides, when a large-sized structure such as the turbine casing is manufactured by the Ni-based alloy, there is a case when a lot of defects such as a shrinkage cavity occur. There is a case when it is difficult to improve the reliability resulting from circumstances as stated above.

Accordingly, a problem to be solved by the present invention is to provide a turbine and a power generation system capable of enabling high reliability.

DETAILED DESCRIPTION

In a turbine according to an embodiment, a turbine rotor is accommodated in a turbine casing, and rotates by a working fluid which is introduced after flowing in an inlet pipe of a combustor. A sleeve is provided at the casing, and an inlet part is accommodated therein. Here, the sleeve is thicker than the inlet pipe, and a cooling fluid whose temperature is lower than the working fluid flows between the inlet part and the sleeve.

Embodiments will be described with reference to the drawings.

First Embodiment

[A] Overall Configuration

Figure 1:
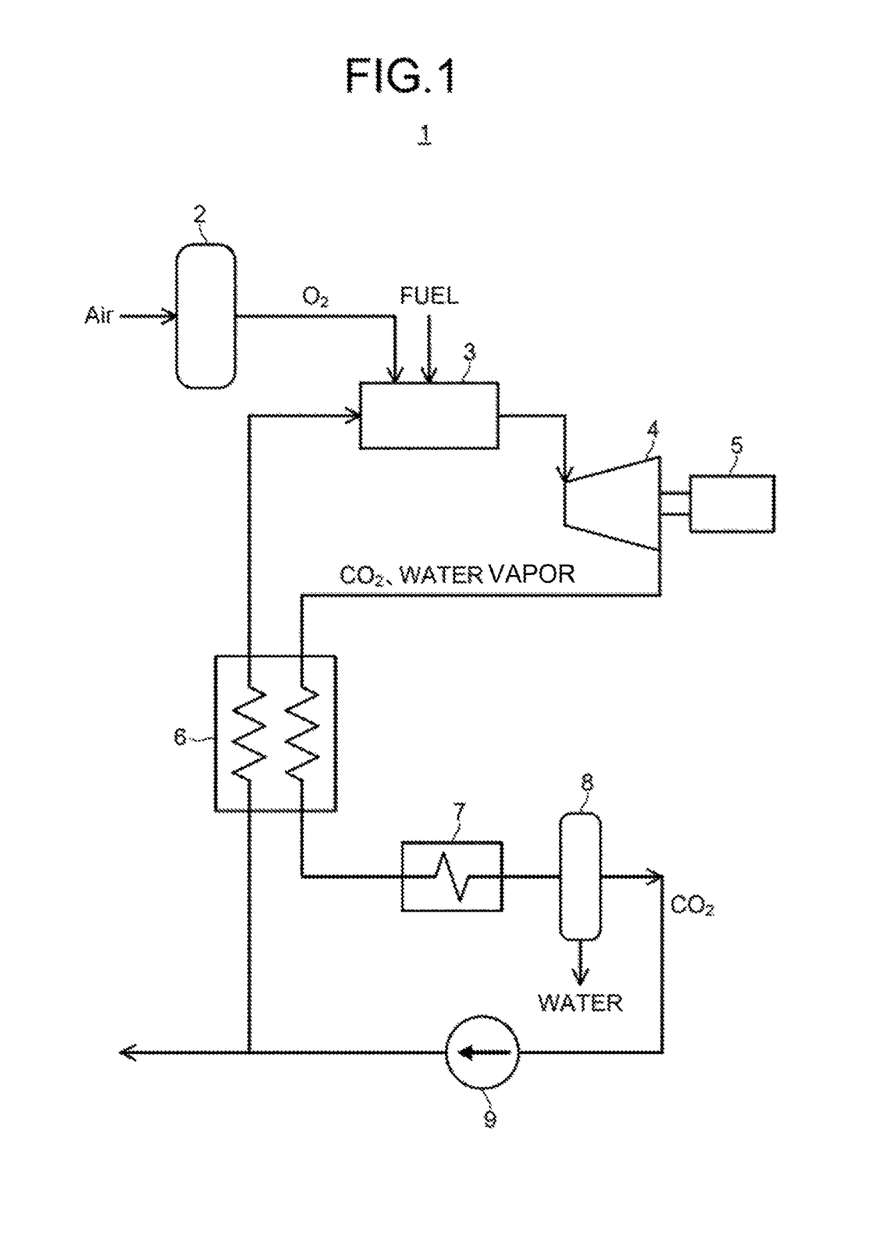
FIG. 1 is a view schematically illustrating a power generation system according to a first embodiment.

FIG. 1 is a view schematically illustrating a power generation system according to a first embodiment.

A power generation system 1 includes an oxygen generator 2, a combustor 3, a turbine 4, a power generator 5, a regenerative heat exchanger 6, a cooler 7, a moisture separator 8, and a pump 9 as illustrated in FIG. 1.

In the power generation system 1, the oxygen generator 2 manufactures oxygen from air supplied from outside.

The combustor 3 is supplied with oxygen from the oxygen generator 2, and fuel from outside. The combustor 3 generates high-temperature and high-pressure $CO_2$ gas (combustion gas) by combustion of the fuel reacting with oxygen.

At the turbine 4, a turbine rotor (not-illustrated in FIG. 1) is accommodated in a casing (not-illustrated in FIG. 1), the high-temperature and high-pressure $CO_2$ gas is supplied from the combustor 3, and thereby, the turbine rotor rotates. Namely, the turbine 4 is a $CO_2$ turbine.

The power generator 5 is driven by a rotation shaft which rotates by the rotation of the turbine rotor (not-illustrated in FIG. 1) of the turbine 4 and performs power generation.

The regenerative heat exchanger 6 is supplied with fluid discharged from the turbine 4, and a part of fluid discharged from the pump 9, and heat exchange is performed between both fluids. A part of the fluid discharged from the pump 9 is supplied to the combustor 3 after passing through the regenerative heat exchanger 6.

The cooler 7 cools the fluid discharged from the turbine 4 via the regenerative heat exchanger 6.

The moisture separator 8 separates the fluid discharged from the cooler 7 into $CO_2$ and water.

The pump 9 is supplied with the $CO_2$ discharged from the cooler 7. A part of the $CO_2$ discharged from the pump 9 is supplied to the regenerative heat exchanger 6, and another part is stored at outside.

[B] Configurations of Combustor 3 and Turbine 4

Figure 2:
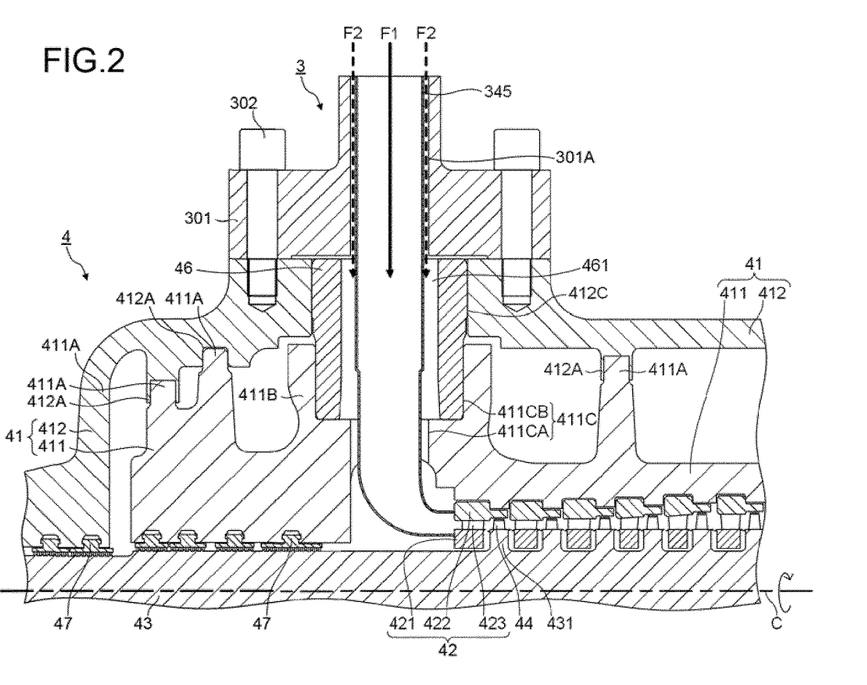
FIG. 2 is a sectional view illustrating a substantial part of a combustor and a substantial part of a turbine in the power generation system according to the first embodiment.

FIG. 2 is a sectional view illustrating a substantial part of a combustor and a substantial part of a turbine in the power generation system according to the first embodiment. In FIG. 2, a part of a cross section of a vertical surface is illustrated.

As illustrated in FIG. 2, the combustor 3 includes a combustor casing 301 and an inlet pipe 345. Besides, the turbine 4 includes a turbine casing 41, stator blades 42, a turbine rotor 43, rotor blades 44, a sleeve 46, and labyrinth seals 47. Respective parts are formed by metal materials.

In the power generation system of the present embodiment, $CO_2$ gas F1 (combustion gas) flows in the inlet pipe 345 of the combustor 3. The $CO_2$ gas F1 (combustion gas) is introduced into the turbine 4 as a working fluid, and flows in the turbine 4. Here, the $CO_2$ gas F1 whose temperature at an entrance of the turbine 4 is 800° C. or more and pressure is 20 MPa or more flows as the working fluid. At the turbine 4, the $CO_2$ gas F1 is supplied to the rotor blades 44 via the stator blades 42, and thereby, the turbine rotor 43 rotates while using an axial direction C as a rotation shaft. The working fluid is discharged from an exit (not-illustrated) of the turbine 4.

Hereinafter, respective parts constituting the combustor 3 and the turbine 4 are described in sequence.

[B-1] Combustor Casing 301

The combustor casing 301 is coupled to an outer peripheral surface of the turbine casing 41 by using bolts 302 as illustrated in FIG. 2.

[B-2] Inlet Pipe 345

The inlet pipe 345 is provided at the combustor casing 301 as illustrated in FIG. 2. The inlet pipe 345 is a tubular body, and is provided at an inner space 301A of the combustor casing 301.

Besides, the inlet pipe 345 is provided to penetrate between the outer peripheral surface and an inner peripheral surface of the turbine casing 41, and introduces the $CO_2$ gas F1 generated at the combustor 3 into the turbine casing 41.

Specifically, the inlet pipe 345 extends along a radial direction (a direction perpendicular to the axial direction C) of the turbine rotor 43 at the inner space 301A of the combustor casing 301 and in inlet ports 411C, 412C of the turbine casing 41. At this part, the inlet pipe 345 is coaxially provided relative to the inner space 301A of the combustor casing 301 and the inlet ports 411C, 412C of the turbine casing 41.

The inlet pipe 345 extends along the axial direction C of the turbine rotor 43 at inside of the turbine casing 41. As for the part of the inlet pipe 345 extending in the axial direction C of the turbine rotor 43, one end is coupled to the extending part in the radial direction via a curved part, and the other end is coupled to a first stage stator blade 42. Namely, the inlet pipe 345 supplies the $CO_2$ gas F1 being the working fluid from outside to the first stage stator blade 42.

In the present embodiment, an outer diameter of the inlet pipe 345 is smaller than an inner diameter of the inner space 301A of the combustor casing 301. The inlet pipe 345 is accommodated in the inner space 301A so that a cooling fluid passage 461 lies between an outer peripheral surface of the inlet pipe 345 and an inner peripheral surface of the inner space 301A of the combustor casing 301.

At the cooling fluid passage 461, a cooling fluid F2 is supplied from a cooling fluid supply part (not-illustrated) provided at outside, and flows inside.

[B-3] Turbine Casing 41

The turbine casing 41 has a double structure, includes an inner casing 411 and an outer casing 412, and accommodates the turbine rotor 43 therein as illustrated in FIG. 2.

[B-3-1] Inner Casing 411

Within the turbine casing 41, the inner casing 411 surrounds an outer peripheral surface of the turbine rotor 43. The inner casing 411 includes a cylindrical part, and projecting parts 411A are provided to project toward outside at an outer peripheral surface thereof.

Besides, at the inner casing 411, an entrance part 411B is provided to project toward outside from the outer peripheral surface. The entrance part 411B is a tubular state, and the inlet port 411C is formed therein. The inlet port 411C is formed at the entrance part 411B to penetrate between the outer peripheral surface and an inner peripheral surface of the inner casing 411.

The inlet port 411C of the inner casing 411 includes a first inlet port part 411CA and a second inlet port part 411CB. Both of the first inlet port part 411CA and the second inlet port part 411CB are sequentially formed from an inner side toward an outer side of the inner casing 411, and they are communicated with each other. Both of the first inlet port part 411 CA and the second inlet port part 411 CB are columnar shapes, coaxially arranged with each other, and an inner diameter of the second inlet port part 411CB is larger than an inner diameter of the first inlet port part 411CA.

[B-3-2] Outer Casing 412

Within the turbine casing 41, the outer casing 412 accommodates the inner casing 411 therein. Namely, the outer casing 412 is provided to surround the outer peripheral surface of the turbine rotor 43 via the inner casing 411. The outer casing 412 includes a cylindrical part, and recessed parts 412A are provided at an inner peripheral surface. The projecting part 411A of the inner casing 411 is engaged in the recessed part 412A of the outer casing 412.

At the outer casing 412, an inlet port 412C is formed to penetrate between an outer peripheral surface and the inner peripheral surface of the outer casing 412. The inlet port 412C of the outer casing 412 is a columnar shape, coaxially arranged with the inlet port 411C of the inner casing 411, and provided to be communicated with the inlet port 411C of the inner casing 411. Besides, an inner diameter of the inlet port 412C of the outer casing 412 is larger than the inlet port 411C of the inner casing 411.

[B-4] Stator Blade 42

The stator blades 42 are provided at the inner peripheral surface of the inner casing 411 constituting the turbine casing 41 as illustrated in FIG. 2. Here, the stator blades 42 are provided in plural stages. The plural stages of stator blades 42 are arranged along the axial direction C of the turbine rotor 43.

At the stator blade 42, inside rings 421 and outside rings 422 roundly surround the outer peripheral surface of the turbine rotor 43, and nozzle plates 423 are arranged in plural with intervals therebetween in a rotation direction of the turbine rotor 43 between the respective inside rings 421 and outside rings 422. The stator blades 42 supply the working fluid to the rotor blades 44 from gaps between the plural nozzle plates 423 to rotate the turbine rotor 43.

[B-5] Turbine Rotor 43

At the turbine rotor 43, rotor disks 431 are provided at the outer peripheral surface thereof as illustrated in FIG. 2.

At the turbine rotor 43, the rotor disks 431 roundly surround the outer peripheral surface of the turbine rotor 43, and the plural rotor disks 431 are provided to be arranged with intervals therebetween along the axial direction C of the turbine rotor 43. Each rotor disk 431 positions at a downstream side at the stator blade 42 of each stage.

The turbine rotor 43 is rotatably supported by a rotor bearing (not-illustrated), and rotates while using the axial direction C as a rotation shaft. Besides, the turbine rotor 43 is coupled to the power generator 5 (refer to FIG. 1).

[B-6] Rotor Blade 44

The rotor blades 44 are provided at outer peripheral surfaces of the rotor disks 431 provided at the turbine rotor 43 as illustrated in FIG. 2. Here, the rotor blades 44 are provided in plural stages with corresponding to the plural stages of stator blades 42. The plural stages of rotor blades 44 are arranged along the axial direction C of the turbine rotor 43.

Though it is not illustrated, at each stage, the rotor blade 44 is provided with plural blades with intervals therebetween in the rotation direction of the turbine rotor 43. At each stage, the rotor blade 44 is supplied with the working fluid from the stator blade 42 provided at the upstream side.

[B-7] Sleeve 46

The sleeve 46 is provided at the turbine casing 41 as illustrated in FIG. 2.

Specifically, the sleeve 46 is a tubular body, and provided in the inlet ports 411C, 412C of the turbine casing 41. Here, a lower part of an outer peripheral surface of the sleeve 46 is in contact with an inner peripheral surface of the second inlet port part 411CB at the inlet port 411C of the inner casing 411. Besides, an upper part of the outer peripheral surface of the sleeve 46 is in contact with an inner peripheral surface of the inlet port 412C of the outer casing 412.

In the present embodiment, the sleeve 46 is formed to be thicker than the inlet pipe 345.

Besides, an inner diameter of the sleeve 46 is larger than the outer diameter of the inlet pipe 345. The sleeve 46 accommodates the inlet pipe 345 therein so that the cooling fluid passage 461 is formed between the sleeve 46 and the inlet pipe 345.

At the cooling fluid passage 461 of the sleeve 46, the cooling fluid F2 is supplied from a cooling fluid supply part (not-illustrated) provided at outside, and flows therein. The cooling fluid F2 flows in the cooling fluid passage 461 provided between the outer peripheral surface of the inlet pipe 345 and the inner peripheral surface of the inner space 301A of the combustor casing 301, and thereafter, flows in the cooling fluid passage 461 provided between the outer peripheral surface of the inlet pipe 345 and an inner peripheral surface of the sleeve 46.

[B-8] As for Labyrinth Seal

The labyrinth seals 47 are provided at the inner peripheral surface of the turbine casing 41 as illustrated in FIG. 2. The labyrinth seal 47 seals between an inner peripheral surface and the outer peripheral surface of the turbine rotor 43 to prevent that the $CO_2$ gas F1 being the working fluid and the cooling fluid F2 leak outside.

Specifically, the labyrinth seals 47 are provided in plural to be arranged in the axial direction C of the turbine rotor 43 at the inner peripheral surface of the inner casing 411. Besides, the labyrinth seals 47 are provided in plural to be arranged in the axial direction C of the turbine rotor 43 at the inner peripheral surface of the outer casing 412.

[C] Actions

Hereinafter, actions of the cooling fluid F2 flowing in the cooling fluid passage 461 of the sleeve 46 at the turbine 4 are described with reference to FIG. 2.

As illustrated in FIG. 2, the cooling fluid F2 flows in the cooling fluid passage 461 provided between the outer peripheral surface of the inlet pipe 345 and the inner peripheral surface of the inner space 301A of the combustor casing 301. After that, the cooling fluid F2 flows in the cooling fluid passage 461 provided between the outer peripheral surface of the inlet pipe 345 and the inner peripheral surface of the sleeve 46. The cooling fluid F2 is supplied from the cooling fluid supply part (not-illustrated) provided at outside, and flows in the cooling fluid passage 461. For example, the cooling fluid F2 is $CO_2$ gas, and a pressure is higher and a temperature is lower than the $CO_2$ gas F1 which flows the inlet pipe 345 as the working fluid. Therefore, in the present embodiment, heat transmitted from the inlet pipe 345 to the turbine casing 41 is lower than a case when the cooling fluid passage 461 does not exist, and the turbine casing 41 is cooled by the cooling fluid F2.

After that, the cooling fluid F2 flows from the cooling fluid passage 461 into the turbine casing 41 via a space between an inner peripheral surface of the first inlet port part 411CA and the outer peripheral surface of the inlet pipe 345. The cooling fluid F2 is introduced into holes (not-illustrated) provided at the stator blades 42 to cool the stator blades 42 in the turbine casing 41. Besides, the cooling fluid F2 is introduced into holes (not-illustrated) provided at the rotor blades 44 to cool the rotor blades 44. After that, the cooling fluid F2 is discharged outside of the turbine 4.

[D] Summary

As stated above, in the power generation system 1 of the present embodiment, the sleeve 46 accommodates the inlet pipe 345 which introduces the working fluid rotating the turbine rotor 43 into the turbine casing 41 therein at the turbine 4. The cooling fluid F2 whose temperature is lower than the $CO_2$ gas F1 being the working fluid flows between the inlet pipe 345 and the sleeve 46.

Accordingly, in the present embodiment, the increase of the temperature of the turbine casing 41 is suppressed by the cooling fluid F2, and it is possible to maintain the temperature of the turbine casing 41 within a tolerable range. As a result, it is possible to prevent that mechanical strength of the turbine casing 41 decreases and to enable high reliability.

Further, in the present embodiment, the temperature increase of the turbine casing 41 can be suppressed, and therefore, it is possible to form the turbine casing 41 by using a ferritic material without using an Ni-based alloy, Co-based alloy. As a result, it is possible to manufacture a casing whose weight is large and thickness is thick by using the inexpensive ferritic material, and therefore, it is possible to easily enable cost cutting. Further, in the present embodiment, a pressure at a part which is directly in contact with the outer casing 412 constituting the turbine casing 41 is lowered, and therefore, it is not necessary to make the outer casing 412 thick, and the cost cutting can be enabled more easily.

Besides, in the present embodiment, the stator blades 42 and the rotor blades 44 are cooled by the cooling fluid F2 which is supplied after it flows between the inlet pipe 345 and the sleeve 46. Accordingly, it is not necessary to introduce the cooling fluid F2 to the stator blades 42 and the rotor blades 44 from other systems, and therefore, efficiency can be improved.

In the present embodiment, at the inlet pipe 345, a temperature difference between an inside where the $CO_2$ gas F1 being the working fluid flows and an outside where the cooling fluid F2 flows is large. For example, there is the temperature difference of 300° C. or more. Besides, in the present embodiment, at the sleeve 46, a pressure difference between an inside where the cooling fluid F2 flows and an outside of the sleeve 46 (between the inner casing 411 and the outer casing 412) is large. For example, there is the pressure difference of 50 ata or more.

In the present embodiment, the inlet pipe 345 is thin and the sleeve 46 is thick. When both are compared, they are in a relationship in which one is thinner than the other. As stated above, in the present embodiment, the inlet pipe 345 is thin, and therefore, it is possible to make a thermal stress of the inlet pipe 345 small by absorbing the above-stated temperature difference, so it is possible to improve reliability. Besides, in the present embodiment, the sleeve 46 is thick, and therefore, it is possible to make a hoop stress of the sleeve 46 small by absorbing the above-stated pressure difference, so it is possible to improve the reliability. Namely, the thin inlet pipe 345 and the thick sleeve 46 are combined, and thereby, it is possible to solve the problem.

[E] Modified Example

In the power generation system 1 of the embodiment, the combustor 3 is provided at outside of the turbine 4 (refer to FIG. 1), but it is not limited thereto. The combustor 3 may be provided at inside of the turbine 4. The combustor 3 may either be single or plural.

In the embodiment, the turbine casing 41 of the turbine 4 is the double structure including the inner casing 411 and the outer casing 412, but it is not limited thereto. The turbine casing 41 may be constituted as, for example, a single structure.

In the embodiment, a case when the inlet pipe 345 is formed by a single tubular body is described, but it is not limited thereto. For example, the inlet pipe 345 may be constituted by coupling plural tubular bodies.

Second Embodiment

[A] Configuration

Figure 3:
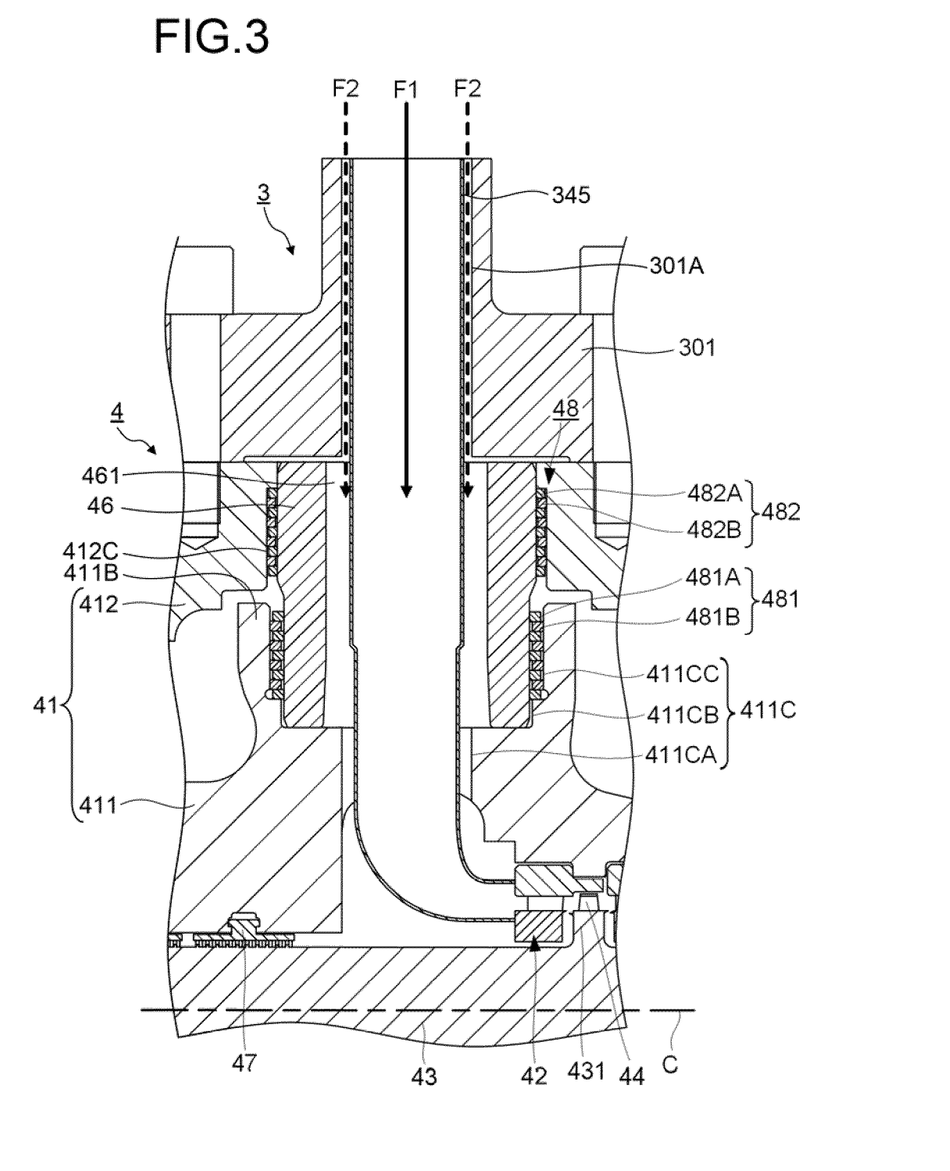
FIG. 3 is a sectional view illustrating a substantial part of a combustor and a substantial part of a turbine in a power generation system according to a second embodiment.

FIG. 3 is a sectional view illustrating a substantial part of a combustor and a substantial part of a turbine in a power generation system according to a second embodiment. In FIG. 3, a part where the $CO_2$ gas F1 being the working fluid is introduced into the turbine casing 41 in FIG. 2 is illustrated.

As illustrated in FIG. 3, in the present embodiment, a sealing part 48 is further provided. The present embodiment is similar to the first embodiment except the above-stated point and relating points. Accordingly, descriptions of redundant parts in the present embodiment with the above-stated embodiment are appropriately omitted.

The sealing part 48 includes a first sealing part 481 and a second sealing part 482 as illustrated in FIG. 3, and they are provided between inner peripheral surfaces of the inlet ports 411C, 412C of the turbine casing 41 and the outer peripheral surface of the sleeve 46. Hereinafter, respective parts constituting the sealing part 48 are described in sequence.

[A-1] First Sealing Part 481

Within the sealing part 48, the first sealing part 481 includes first seal rings 481A and second seal rings 481B, and the first seal rings 481A and the second seal rings 481B are alternately stacked.

In the present embodiment, at the inlet port 411C of the inner casing 411, a third inlet port part 411CC whose inner diameter is larger than the second inlet port part 411CB is formed at upward of the second inlet port part 411CB, and the first sealing part 481 is provided between an inner peripheral surface of the third inlet port part 411CC and the outer peripheral surface of a lower part of the sleeve 46.

At the first sealing part 481, an inner diameter of the first seal ring 481A is the same as an outer diameter at the lower part of the sleeve 46, and an inner peripheral surface of the first seal ring 481A is in contact with the outer peripheral surface at the lower part of the sleeve 46. Besides, an outer diameter of the first seal ring 481A is smaller than the inner diameter of the third inlet port part 411CC, and an outer peripheral surface of the first seal ring 481A is apart from the inner peripheral surface of the third inlet port part 411CC. Here, the first seal ring 481A is not fixed to the sleeve 46. Among the plural first seal rings 481A, a lower surface of the first seal ring 481A at a lowermost stage is supported by the inner casing 411, and lower surfaces of the other first seal rings 481A are supported by the second seal rings 481B.

At the first sealing part 481, an inner diameter of the second seal ring 481B is larger than the outer diameter at the lower part of the sleeve 46, and an inner peripheral surface of the second seal ring 481B is apart from the outer peripheral surface at the lower part of the sleeve 46. Besides, an outer diameter of the second seal ring 481B is the same as the inner diameter of the third inlet port part 411CC, and an outer peripheral surface of the second seal ring 481B is in contact with the inner peripheral surface of the third inlet port part 411CC. Here, the second seal ring 481B is fixed to the inner peripheral surface of the third inlet port part 411CC.

[A-2] Second Sealing Part 482

Within the sealing part 48, the second sealing part 482 includes third seal rings 482A and fourth seal rings 482B, and the third seal rings 482A and the fourth seal rings 482B are alternately stacked.

The second sealing part 482 is provided between the inner peripheral surface of the inlet port 412C of the outer casing 412 and the outer peripheral surface at an upper part of the sleeve 46.

At the second sealing part 482, an inner diameter of the third seal ring 482A is the same as the outer diameter at the upper part of the sleeve 46, and an inner peripheral surface of the third seal ring 482A is in contact with the outer peripheral surface at the upper part of the sleeve 46. Besides, an outer diameter of the third seal ring 482A is smaller than the inner diameter of the inlet port 412C of the outer casing 412, and an outer peripheral surface of the third seal ring 482A is apart from the inner peripheral surface of the inlet port 412C of the outer casing 412. Here, the third seal ring 482A is not fixed to the sleeve 46, and a lower surface thereof is supported by the outer casing 412.

At the second sealing part 482, an inner diameter of the fourth seal ring 482B is larger than the outer diameter at the upper part of the sleeve 46, and an inner peripheral surface of the fourth seal ring 482B is apart from the outer peripheral surface at the upper part of the sleeve 46. Besides, an outer diameter of the fourth seal ring 482B is the same as the inner diameter of the inlet port 412C of the outer casing 412, and an outer peripheral surface of the fourth seal ring 482B is in contact with the inner peripheral surface of the inlet port 412C of the outer casing 412. Here, the fourth seal ring 482B is fixed to the inner peripheral surface of the inlet port 412C of the outer casing 412.

[B] Actions

Hereinafter, in the present embodiment, actions of the sealing part 48 are described with reference to FIG. 3.

When the high-temperature and high-pressure $CO_2$ gas F1 flows in the inlet pipe 345, there is a case when gaps are generated between the turbine casing 41 and the sleeve 46 resulting from a difference of both thermal expansions. Accordingly, there is a possibility that the $CO_2$ gas leaks from the gaps.

However, in the present embodiment, the sealing part 48 is provided between the turbine casing 41 and the sleeve 46 to seal between the turbine casing 41 and the sleeve 46. Accordingly, in the present embodiment, it is possible to prevent that the $CO_2$ gas leaks out of the gaps.

Specifically, even when a space between the inner casing 411 and the sleeve 46 is separated resulting from the difference of the thermal expansions, the first sealing part 481 keeps a state in which the first seal rings 481A and the second seal rings 481B are stacked with each other. Accordingly, the first sealing part 481 is able to seal between the inner casing 411 and the sleeve 46.

Besides, even when a space between the outer casing 412 and the sleeve 46 is separated resulting from the difference of the thermal expansions, the second sealing part 482 keeps a state in which the third seal rings 482A and the fourth seal rings 482B are stacked with each other. Accordingly, the second sealing part 482 is able to seal between the outer casing 412 and the sleeve 46.

[C] Summary

As stated above, in the present embodiment, the sealing part 48 seals between the turbine casing 41 and the sleeve 46. Accordingly, it is possible to prevent that the $CO_2$ gas leaks from between the turbine casing 41 and the sleeve 46.

As a result, in the present embodiment, it is possible to improve efficiency of the turbine 4 in addition that the high reliability is enabled as same as the first embodiment.

Third Embodiment

[A] Configuration

Figure 4:
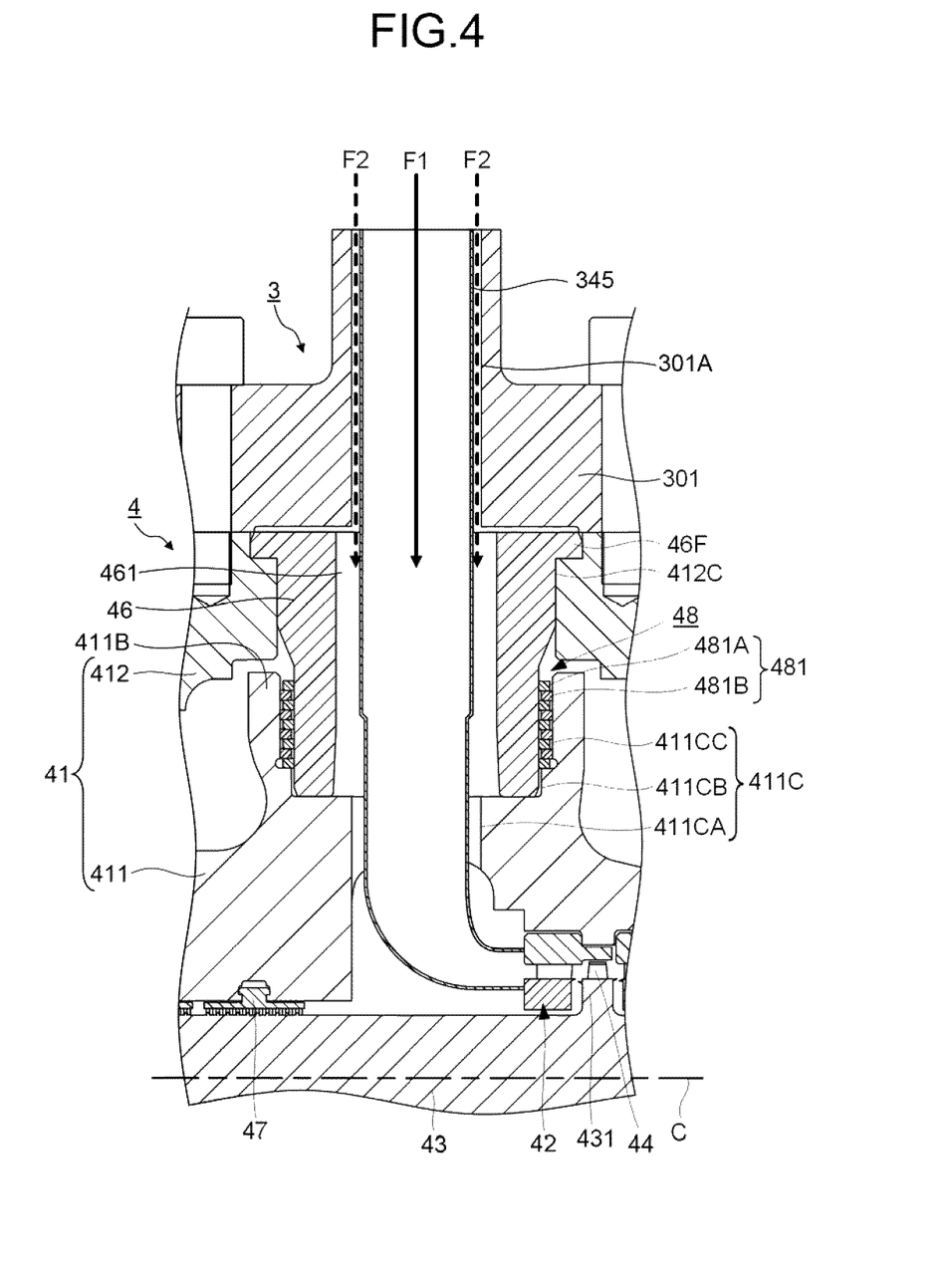
FIG. 4 is a sectional view illustrating a substantial part of a combustor and a substantial part of a turbine in a power generation system according to a third embodiment.

FIG. 4 is a sectional view illustrating a substantial part of a combustor and a substantial part of a turbine in a power generation system according to a third embodiment. In FIG. 4, a part where the $CO_2$ gas F1 being the working fluid is introduced into the turbine casing 41 in FIG. 2 is illustrated as same as FIG. 3.

As illustrated in FIG. 4, in the present embodiment, modes of the sleeve 46 and the sealing part 48 are different from the second embodiment. The present embodiment is similar to the second embodiment except the above-stated point and relating points. Accordingly, descriptions of redundant parts in the present embodiment with the above-stated embodiment are appropriately omitted.

A flange 46F is provided at an upper end part of the sleeve 46 as illustrated in FIG. 4. The sleeve 46 is fixed to the outer casing 412 by fastening members (not-illustrated) such as bolts attached to the outer casing 412 by penetrating the flange 46F.

The sealing part 48 is provided between the inner casing 411 and the sleeve 46 as illustrated in FIG. 4. Namely, in the sealing part 48, only the first sealing part 481 is provided and the second sealing part 482 (refer to FIG. 3) is not provided.

[B] Summary

As stated above, in the present embodiment, the sleeve 46 is fixed to the outer casing 412, and the sealing part 48 is provided between the inner casing 411 and the sleeve 46.

In the present embodiment, the sleeve 46 is inserted into the inlet ports 411C, 412C of the turbine casing 41 after the turbine casing 41 is assembled, and thereby, it is possible to assemble the turbine 4.

Accordingly, in the present embodiment, it is possible to enable the high reliability as same as the above-stated embodiment, and it is possible to effectively perform the assembling of the turbine 4 in addition that it is possible to improve the efficiency of the turbine 4.

Fourth Embodiment

[A] Configuration

Figure 5:
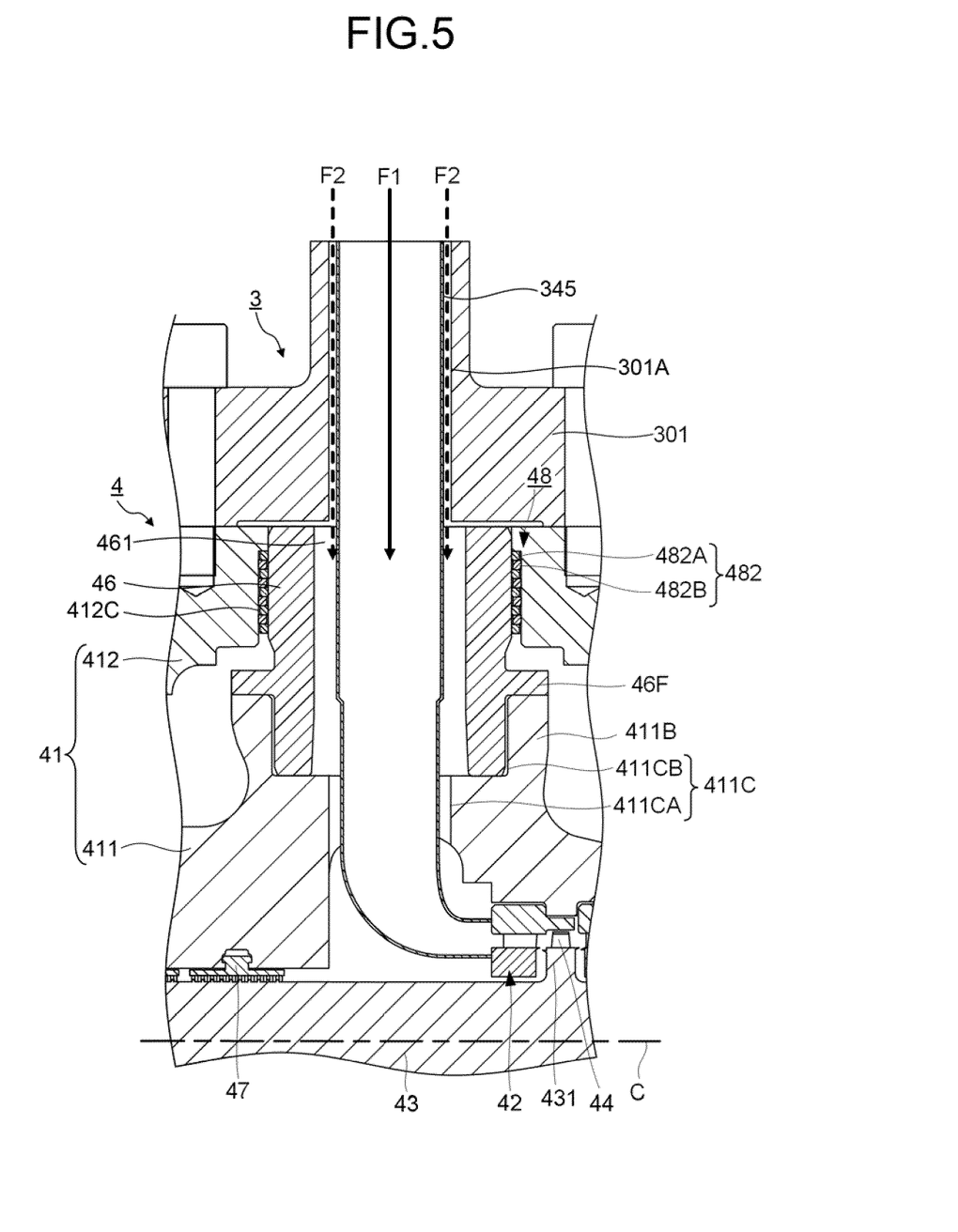
FIG. 5 is a sectional view illustrating a substantial part of a combustor and a substantial part of a turbine in a power generation system according to a fourth embodiment.

FIG. 5 is a sectional view illustrating a substantial part of a combustor and a substantial part of a turbine in a power generation system according to a fourth embodiment. In FIG. 5, a part where the $CO_2$ gas F1 being the working fluid is introduced into the turbine casing 41 in FIG. 2 is illustrated as same as FIG. 3.

As illustrated in FIG. 5, in the present embodiment, modes of the sleeve 46 and the sealing part 48 are different from the second embodiment. The present embodiment is similar to the second embodiment except the above-stated point and related points. Accordingly, descriptions of redundant parts in the present embodiment with the above-stated embodiment are appropriately omitted.

The flange 46F is provided at a center part between the upper end part and a lower end part of the sleeve 46 as illustrated in FIG. 5. The sleeve 46 is fixed to the inner casing 411 by fastening members (not-illustrated) such as bolts attached to an upper end of the entrance part 411B of the inner casing 411 by penetrating the flange 46F.

The sealing part 48 is provided between the outer casing 412 and the sleeve 46 as illustrated in FIG. 5. Namely, in the sealing part 48, only the second sealing part 482 is provided and the first sealing part 481 (refer to FIG. 3) is not provided.

[B] Summary

As stated above, in the present embodiment, the sleeve 46 is fixed to the inner casing 411, and the sealing part 48 is provided between the outer casing 412 and the sleeve 46.

Accordingly, in the present embodiment, it is possible to improve the efficiency of the turbine 4 in addition to enable the high reliability as same as the above-stated embodiments.

Fifth Embodiment

[A] Configuration

Figure 6:
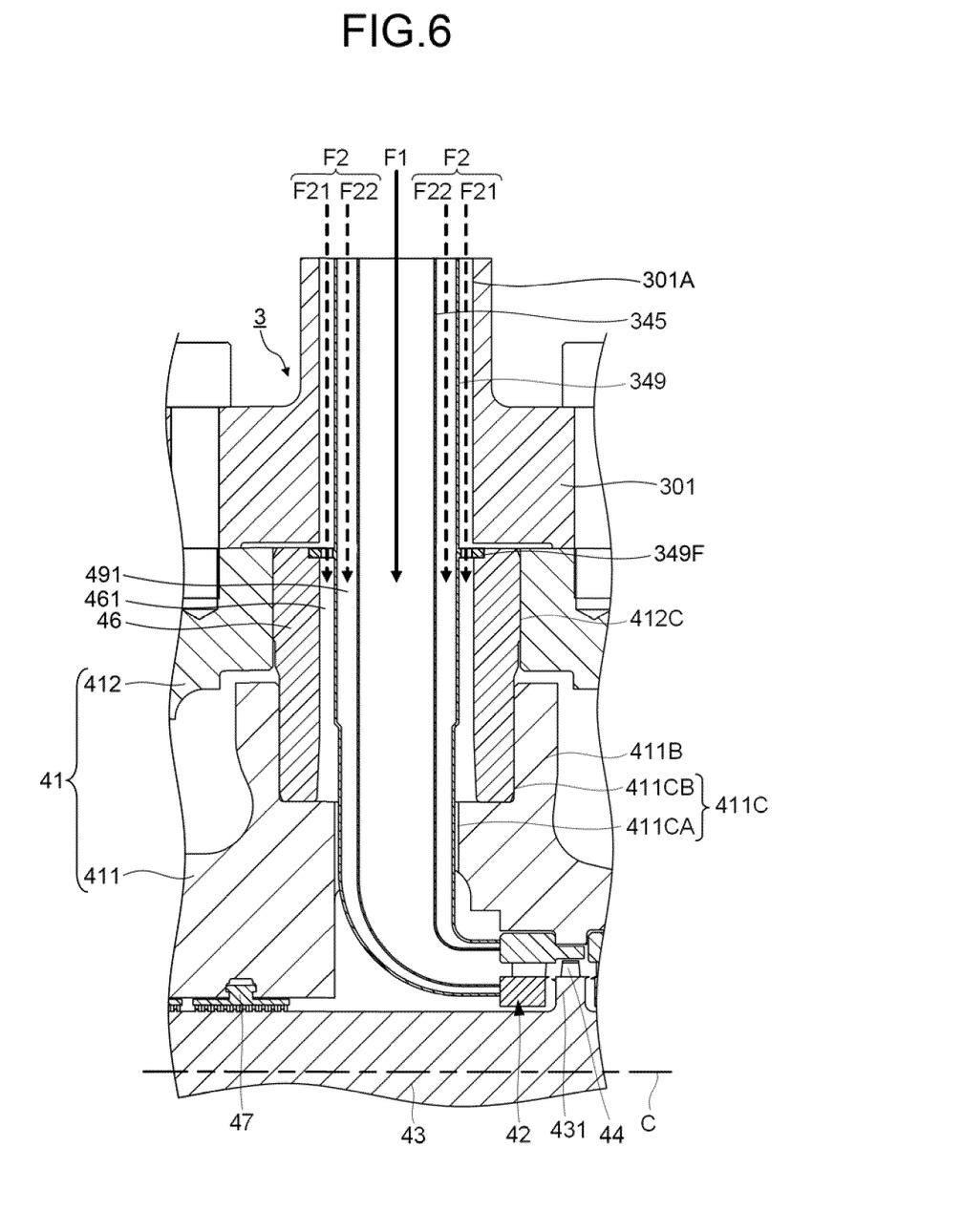
FIG. 6 is a sectional view illustrating a substantial part of a combustor and a substantial part of a turbine in a power generation system according to a fifth embodiment.

FIG. 6 is a sectional view illustrating a substantial part of a combustor and a substantial part of a turbine in a power generation system according to a fifth embodiment. In FIG. 6, a part where the $CO_2$ gas F1 being the working fluid is introduced into the turbine casing 41 in FIG. 2 is illustrated.

As illustrated in FIG. 6, in the present embodiment, a heat shielding pipe 349 is further provided. The present embodiment is similar to the first embodiment except the above-stated point and related points. Accordingly, descriptions of redundant parts in the present embodiment with the above-stated embodiment are appropriately omitted.

The heat shielding pipe 349 is provided at the combustor casing 301 as illustrated in FIG. 6. The heat shielding pipe 349 is a tubular body, and provided at the inner space 301A of the combustor casing 301.

Besides, the heat shielding pipe 349 is provided to include a part penetrating between the outer peripheral surface and the inner peripheral surface of the turbine casing 41.

Specifically, the heat shielding pipe 349 extends along the radial direction (the direction perpendicular to the axial direction C) of the turbine rotor 43 at the inner space 301A of the combustor casing 301 and in the inlet ports 411C, 412C of the turbine casing 41. At this part, the heat shielding pipe 349 is coaxially provided relative to the inner space 301A of the combustor casing 301, and the inlet ports 411C, 412C of the turbine casing 41.

The heat shielding pipe 349 extends along the axial direction C of the turbine rotor 43 at inside of the turbine casing 41. In a part extending in the axial direction C of the turbine rotor 43 of the heat shielding pipe 349, one end is coupled to the extending part in the radial direction via a curved part, and the other end is coupled to the first stage stator blade 42.

An inner diameter of the heat shielding pipe 349 is larger than the outer diameter of the inlet pipe 345, and a cooling fluid passage 491 is formed between an inner peripheral surface of the heat shielding pipe 349 and the outer peripheral surface of the inlet pipe 345. The heat shielding pipe 349 is formed by, for example, the Ni-based alloy, a stainless steel, and the inlet pipe 345 accommodated therein is formed by, for example, the Ni-based alloy. Note that both may be formed by the same metal material.

Besides, an outer diameter of the heat shielding pipe 349 is smaller than the inner diameter of the inner space 301A of the combustor casing 301. In addition, the outer diameter of the heat shielding pipe 349 is smaller than the inner diameter of the sleeve 46. At an upper part of the heat shielding pipe 349, the cooling fluid passage 461 is formed between an outer peripheral surface of the heat shielding pipe 349 and the inner peripheral surface of the inner space 301A of the combustor casing 301. Besides, the cooling fluid passage 461 is formed between the outer peripheral surface of the heat shielding pipe 349 and the inner peripheral surface of the sleeve 46. At the heat shielding pipe 349, a flange 349F is provided at the outer peripheral surface, and the flange 349F is in contact with an upper end part of the sleeve 46 to be supported.

[B] Actions

Hereinafter, actions of the cooling fluid F2 flowing in the cooling fluid passages 461, 491 in the present embodiment are described with reference to FIG. 6.

As illustrated in FIG. 6, a first cooling fluid F21 within the cooling fluid F2 flows between the combustor casing 301 and the heat shielding pipe 349. After that, the first cooling fluid F21 is supplied to the cooling fluid passage 461 provided at a space with the heat shielding pipe 349 in the sleeve 46 via a hole provided at the flange 349F of the heat shielding pipe 349. On the other hand, a second cooling fluid F22 within the cooling fluid F2 is supplied to the cooling fluid passage 491 provided at a space with the inlet pipe 345 in the heat shielding pipe 349. The first cooling fluid F21 and the second cooling fluid F22 are supplied from the cooling fluid supply part (not-illustrated) provided at outside to the respective cooling fluid passages 461, 491 and flow in the respective cooling fluid passages 461, 491. For example, the first cooling fluid F21 and the second cooling fluid F22 are $CO_2$ gas, their pressures are higher and temperatures are lower compared to the $CO_2$ gas F1 flowing in the inlet pipe 345 as the working fluid. Besides, the temperature of the second cooling fluid F22 is lower than the $CO_2$ gas F1 and higher than the first cooling fluid F21. Accordingly, in the present embodiment, heat transmitted from the inlet pipe 345 to the turbine casing 41 is lower compared to a case when the cooling fluid passages 461, 491 do not exist, and the turbine casing 41 is cooled by the cooling fluid F2.

After that, the first cooling fluid F21 and the second cooling fluid F22 flow in the turbine casing 41 and are discharged outside as same as the first embodiment.

[C] Summary

As stated above, in the present embodiment, the heat shielding pipe 349 accommodates the inlet pipe 345 therein, and the heat shielding pipe 349 is accommodated in the sleeve 46. The cooling fluid F2 whose temperature is lower than the working fluid F1 flows between the heat shielding pipe 349 and the inlet pipe 345.

Therefore, in the present embodiment, a temperature difference between an inner surface and an outer surface of the sleeve 46 is relaxed by the cooling fluid F2, and therefore, it is possible to suppress that the sleeve 46 expands due to heat. As a result, it is possible to reduce that the gaps are generated between the sleeve 46 and the turbine casing 41, and to improve the power generation efficiency.

OTHERS

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A turbine, comprising:
   a turbine casing connected with a combustor casing of a combustor for combusting fuel and generating $CO_2$ combustion gas as a working fluid, the combustor having an inlet pipe penetrating the turbine casing so as to introduce the $CO_2$ combustion gas as the working fluid into the turbine casing;
   stator blades provided in the turbine casing;
   a turbine rotor accommodated in the turbine casing, the turbine rotor being rotated by the working fluid, the turbine rotor including rotor blades, the working fluid in the inlet pipe being directly supplied to the stator blades and the rotor blades; and
   a sleeve which is not connected to the inlet pipe and provided at the turbine casing, and surrounding the inlet pipe therein,
   wherein a wall thickness of the sleeve is greater than a wall thickness of the inlet pipe, wherein $CO_2$ gas as a cooling fluid, whose temperature is lower than a temperature of the working fluid and whose pressure is higher than a pressure of the working fluid, is introduced into an inner space defined between an inner surface of the combustor casing, and an outer surface of the inlet pipe, and then the cooling fluid is introduced into the inner space is further introduced into a cooling fluid passage between the outer surface of the inlet pipe and an inner surface of the sleeve, and wherein the stator blades and the rotor blades are cooled by the cooling fluid which is supplied after flowing between the inlet pipe and the sleeve.

2. The turbine according to claim 1, further comprising:
a sealing part provided between the turbine casing and the sleeve,
wherein the sealing part includes:
first seal rings each of whose inner peripheral surfaces is in contact with the sleeve, and outer peripheral surfaces is apart from the turbine casing; and
second seal rings each of whose inner peripheral surfaces is apart from the sleeve, and outer peripheral surfaces is in contact with the turbine casing,
wherein the first seal rings and the second seal rings are stacked.

3. The turbine according to claim 2,
wherein the turbine casing includes:
an inner casing surrounding the turbine rotor; and
an outer casing surrounding the turbine rotor via the inner casing.

4. The turbine according to claim 3,
wherein the sleeve is fixed to the outer casing, and the sealing part is provided between the inner casing and the sleeve.

5. The turbine according to claim 3,
wherein the sleeve is fixed to the inner casing, and the sealing part is provided between the outer casing and the sleeve.

6. The turbine according to claim 1,
wherein a heat shielding pipe of the combustor surrounds the inlet pipe therein, and is surrounded by the sleeve, and
wherein the cooling fluid includes a first cooling fluid flowing between the heat shielding pipe and the sleeve, and a second cooling fluid flowing between the heat shielding pipe and the inlet pipe, a temperature of the first cooling fluid and the second cooling fluid being lower than the temperature of the working fluid.

7. The turbine according to claim 1,
wherein the working fluid has a temperature of 800° C. or more at an entrance of the turbine, and a pressure of 20 MPa.

8. A power generation system, comprising:
the turbine according to claim 1.

9. The turbine according to claim 1,
wherein the sleeve does not contact the inlet pipe.

* * * * *